(12) United States Patent  
Yumoto et al.

(10) Patent No.: US 9,152,286 B2  
(45) Date of Patent: Oct. 6, 2015

(54) TOUCH PANEL SYSTEM AND ELECTRONIC APPARATUS

(75) Inventors: Manabu Yumoto, Osaka (JP); Shunsuke Nagasawa, Osaka (JP); Masayuki Ehiro, Osaka (JP); Shinsuke Anzai, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/368,694

(22) PCT Filed: Apr. 9, 2012

(86) PCT No.: PCT/JP2012/060195  
§ 371 (c)(1),  
(2), (4) Date: Jun. 25, 2014

(87) PCT Pub. No.: WO2013/103022  
PCT Pub. Date: Jul. 11, 2013

(65) Prior Publication Data  
US 2014/0375608 A1    Dec. 25, 2014

(30) Foreign Application Priority Data

Jan. 6, 2012   (JP) ................................. 2012-001448

(51) Int. Cl.  
*G06F 3/041* (2006.01)  
*G06F 3/044* (2006.01)  
*G06F 3/048* (2013.01)

(52) U.S. Cl.  
CPC ............... *G06F 3/044* (2013.01); *G06F 3/041* (2013.01); *G06F 3/048* (2013.01); *G06F 2203/04112* (2013.01)

(58) Field of Classification Search  
CPC ................................ G06F 3/017; G06F 3/044  
USPC ................. 178/18.01–20.04; 345/173–178  
See application file for complete search history.

(56) References Cited

U.S. PATENT DOCUMENTS

| 8,094,132 B1* | 1/2012 | Frischling et al. ............ 345/173 |
| 2005/0073324 A1 | 4/2005 | Umeda et al. |
| 2005/0141263 A1 | 6/2005 | Umeda et al. |

(Continued)

FOREIGN PATENT DOCUMENTS

| JP | 5-298027 A | 11/1993 |
| JP | 2001-125744 A | 5/2001 |

(Continued)

OTHER PUBLICATIONS

US Office Action for co-pending U.S. Appl. No. 14/128,910 dated Mar. 27, 2015.

*Primary Examiner* — Amr Awad  
*Assistant Examiner* — Aaron Midkiff  
(74) *Attorney, Agent, or Firm* — Birch, Stewart, Kolasch & Birch, LLP

(57) ABSTRACT

A touch panel system (11) prevents an incorrect operation caused by an unintended contact of an object with a touch panel while suppressing a decline in sensitivity of detection of presence or absence of a touch on the touch panel. The touch panel system (11) includes a touch invalidating section (9) which, in a case where a specific point of a touch panel (1) is continuously touched for a predetermined period of time, invalidates an instruction that is given, in accordance with the touch, to an electronic apparatus including the touch panel (1).

9 Claims, 7 Drawing Sheets

(56) References Cited

U.S. PATENT DOCUMENTS

| | | |
|---|---|---|
| 2006/0158202 A1 | 7/2006 | Umeda et al. |
| 2006/0256091 A1 | 11/2006 | Hino |
| 2007/0242053 A1 | 10/2007 | Muranaka |
| 2009/0327886 A1* | 12/2009 | Whytock et al. ............... 715/702 |
| 2010/0085324 A1 | 4/2010 | Noguchi et al. |
| 2010/0258361 A1* | 10/2010 | Yamauchi et al. ......... 178/18.06 |
| 2010/0300771 A1 | 12/2010 | Miyazaki |
| 2010/0321331 A1 | 12/2010 | Oda et al. |
| 2010/0321332 A1 | 12/2010 | Oda et al. |
| 2010/0321333 A1 | 12/2010 | Oda et al. |
| 2010/0321334 A1 | 12/2010 | Oda et al. |
| 2011/0043478 A1 | 2/2011 | Matsushima |
| 2011/0148785 A1 | 6/2011 | Oda et al. |
| 2011/0148806 A1 | 6/2011 | Oda et al. |
| 2011/0153263 A1 | 6/2011 | Oda et al. |
| 2012/0146929 A1 | 6/2012 | Oyama |
| 2012/0223906 A1 | 9/2012 | Zhou |

FOREIGN PATENT DOCUMENTS

| | | |
|---|---|---|
| JP | 2004-518188 A | 6/2004 |
| JP | 2005-114362 A | 4/2005 |
| JP | 2005-134240 A | 5/2005 |
| JP | 2006-318393 A | 11/2006 |
| JP | 2007-286814 A | 11/2007 |
| JP | 4364609 B2 | 8/2009 |
| JP | 4387773 B2 | 10/2009 |
| JP | 2010-092275 A | 4/2010 |
| JP | 2010-170267 A | 8/2010 |
| JP | 2010-277198 A | 12/2010 |
| JP | 2011-003036 A | 1/2011 |
| JP | 2011-028603 A | 2/2011 |
| JP | 2011-039990 A | 2/2011 |
| JP | 2011-128982 A | 6/2011 |
| WO | 02/35461 A1 | 5/2002 |
| WO | WO 2009/107415 A1 | 9/2009 |
| WO | WO 2011/065249 A1 | 6/2011 |

* cited by examiner

TOUCH PANEL SYSTEM AND ELECTRONIC APPARATUS

TECHNICAL FIELD

The present invention relates to a touch panel system and an electronic apparatus.

BACKGROUND ART

Currently, introduction of a touch panel system into various kinds of electronic apparatus including portable information devices such as smartphones and automatic vending machines such as automatic ticket vending machines is rapidly progressing.

In such electronic apparatuses, there is a demand for a technique for preventing an incorrect operation caused by an unintended contact of an object with a touch panel.

For example, in a case where a user operates such an electronic apparatus while carrying it in a user's hand, contact of the hand holding the electronic apparatus with a touch panel is judged as a touch on the touch panel. Based on this judgment, an incorrect operation would occur in the electronic apparatus. The incorrect operation caused by such a mechanism is expected to occur in a case where the electronic apparatus is a portable apparatus such as a smartphone, a tablet-type terminal, notebook computer, or the like. This reduces convenience of a user.

FIG. 7 is a diagram explaining this mechanism. As illustrated in FIG. 7, when a hand (object) 73 holding a tablet-type terminal 71 makes contact with a touch panel 72 of the tablet-type terminal 71, the contact is judged as a touch on the touch panel 72. This reduces convenience of a user as mentioned above.

The problem of an incorrect operation caused by such a mechanism is expected to more frequently occur as a width of a frame with respect to a display screen in which a touch panel is provided becomes narrower.

Patent Literature 1 discloses a technique for preventing an incorrect operation of continuously detecting a specific coordinate position although no touch is made to a touch panel.

According to an input device disclosed in Patent Literature 1, in a case where detection of a specific coordinate position continues for a predetermined period of time, it is determined whether or not a difference between a detection value based on a change of an electrostatic field between electrodes and a reference value falls in a predetermined update detection range. In a case where the difference falls in the predetermined update detection range, the reference value is updated to the detection value. Note that the reference value is a value which serves as a standard by which presence or absence of a touch is judged based on the detection value. In a case where the detection value in a specific coordinate position is not less than the reference value or in a case where the detection value in a specific coordinate position is above the reference value, it is determined that a touch has been made to the coordinate position.

In this way, according to the input device disclosed in Patent Literature 1, it is possible to prevent an incorrect operation of continuously detecting a specific coordinate position although no touch is made to a touch panel. Moreover, sensitivity of detection may be improved by detecting presence or absence of a touch on the basis of the updated reference value.

CITATION LIST

Patent Literature 1

Japanese Patent Application Publication, Tokukai, No. 2007-286814 A (Publication Date: Nov. 1, 2007)

SUMMARY OF INVENTION

Technical Problem

According to the input device disclosed in Patent Literature 1, a reference value is updated to a detection value which exceeds the reference value. Accordingly, there arise cases where a detection value which is not less than the reference value or above the reference value before the update is deemed as a value which is below the reference value or not more than the reference value after the update.

That is, in the input device disclosed in Patent Literature 1, a standard by which presence or absence of a touch is judged changes before and after the update of the reference value. Accordingly, there is a possibility that a touch on the touch panel is not judged as a touch. That is, there arises a problem that sensitivity of detection of presence or absence of a touch declines.

The present invention was attained in view of the above problems, and an object of the present invention is to provide a touch panel system which is capable of preventing an incorrect operation caused by an unintended contact of an object with a touch panel while suppressing a decline in sensitivity of detection of presence or absence of a touch on the touch panel. Another object of the present invention is to provide an electronic apparatus including the touch panel system.

Solution to Problem

In order to attain the above object, a touch panel system of the present invention includes a touch invalidating section which, in a case where a specific point of a touch panel is continuously touched for a predetermined period of time, invalidates an instruction that is given, in accordance with the touch, to an electronic apparatus including the touch panel.

According to the arrangement, in a case where a specific point of the touch panel is continuously touched for a predetermined period of time, the touch invalidating section invalidates an instruction that is given, in accordance with the touch, to the electronic apparatus. Accordingly, in a case where an unintended contact of an object with the touch panel continues, such as a case where a hand holding the electronic apparatus makes contact with the touch panel, an instruction corresponding to the contact is not executed. Consequently, it is possible to prevent an incorrect operation caused by an unintended contact of an object with the touch panel.

Further, according to the arrangement, it is unnecessary to change a standard by which presence or absence of a touch is judged for the purpose of preventing such an incorrect operation. It is therefore possible to suppress a decline in sensitivity of detection of presence or absence of a touch.

An electronic apparatus of the present invention includes: the touch panel system of the present invention; and a display device corresponding to the touch panel, the touch panel system and the display device being configured to be capable of detecting simultaneous touches on a plurality of points of the touch panel.

According to the arrangement, it is possible to provide an electronic apparatus that is capable of preventing an incorrect operation caused by an unintended contact of an object with a touch panel while suppressing a decline in sensitivity of detection of presence or absence of a touch, as in the touch panel system of the present invention.

Advantageous Effects of Invention

As described above, the touch panel system of the present invention includes a touch invalidating section which, in a case where a specific point of a touch panel is continuously touched for a predetermined period of time, invalidates an instruction that is given, in accordance with the touch, to an electronic apparatus including the touch panel.

This produces an effect that it is possible to prevent an incorrect operation caused by an unintended contact of an object with a touch panel while suppressing a decline in sensitivity of detection of presence or absence of a touch on the touch panel.

BRIEF DESCRIPTION OF DRAWINGS

FIG. 1 is a graph illustrating an example in which a touch operation is invalidated by a touch invalidating section of an embodiment of the present invention.

FIG. 2 is a block diagram illustrating an outline configuration of a touch panel system of the embodiment of the present invention.

FIG. 3 is a flow chart showing an example of how a touch operation is invalidated by the touch invalidating section of the embodiment of the present invention.

FIG. 4 is a graph illustrating another example in which a touch operation is invalidated by the touch invalidating section of the embodiment of the present invention.

FIG. 5 is a block diagram illustrating an example of an outline configuration of an electronic apparatus of the embodiment of the present invention.

Figure 6:
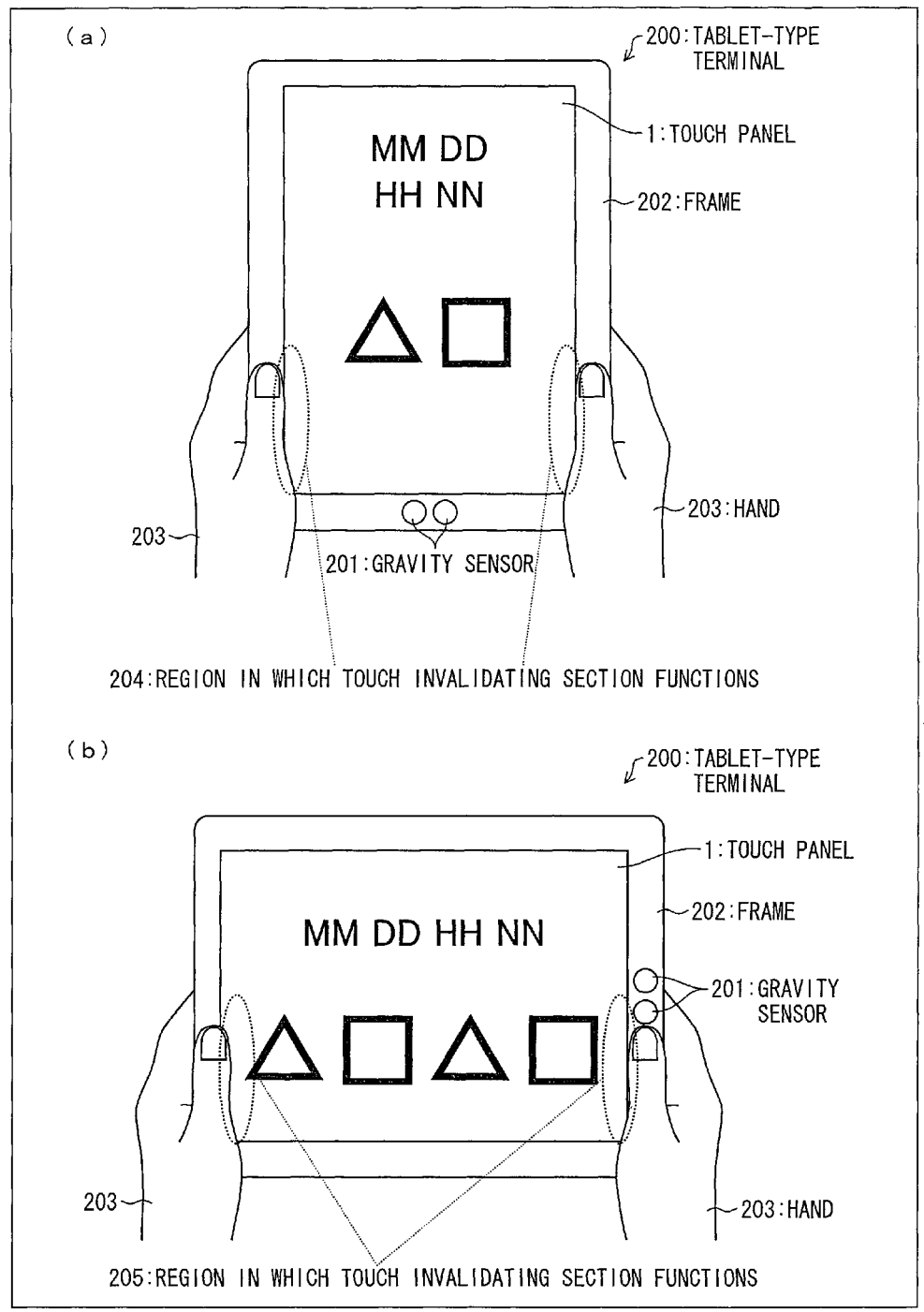
FIG. 6

(a) and (b) of FIG. 6 are diagrams illustrating still another example in which a touch operation is invalidated by the touch invalidating section of the embodiment of the present invention.

FIG. 7

Figure 7:
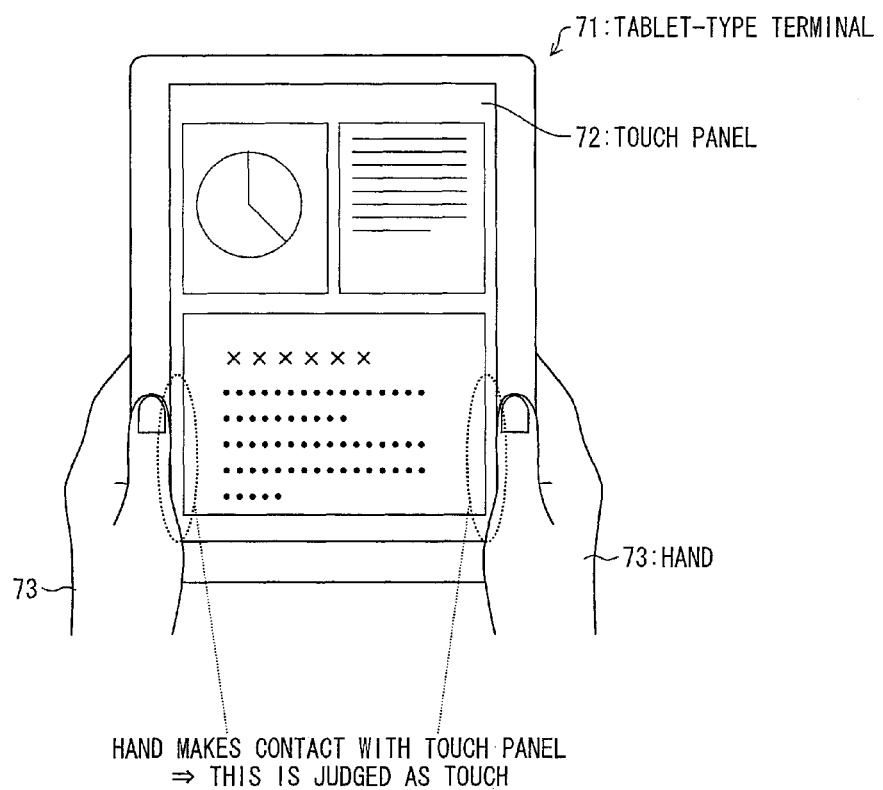

FIG. 7 is a diagram explaining an example of a mechanism of how an incorrect operation is caused by an unintended contact of an object with a conventional touch panel.

DESCRIPTION OF EMBODIMENTS

[Configuration of Touch Panel System]

Figure 2:
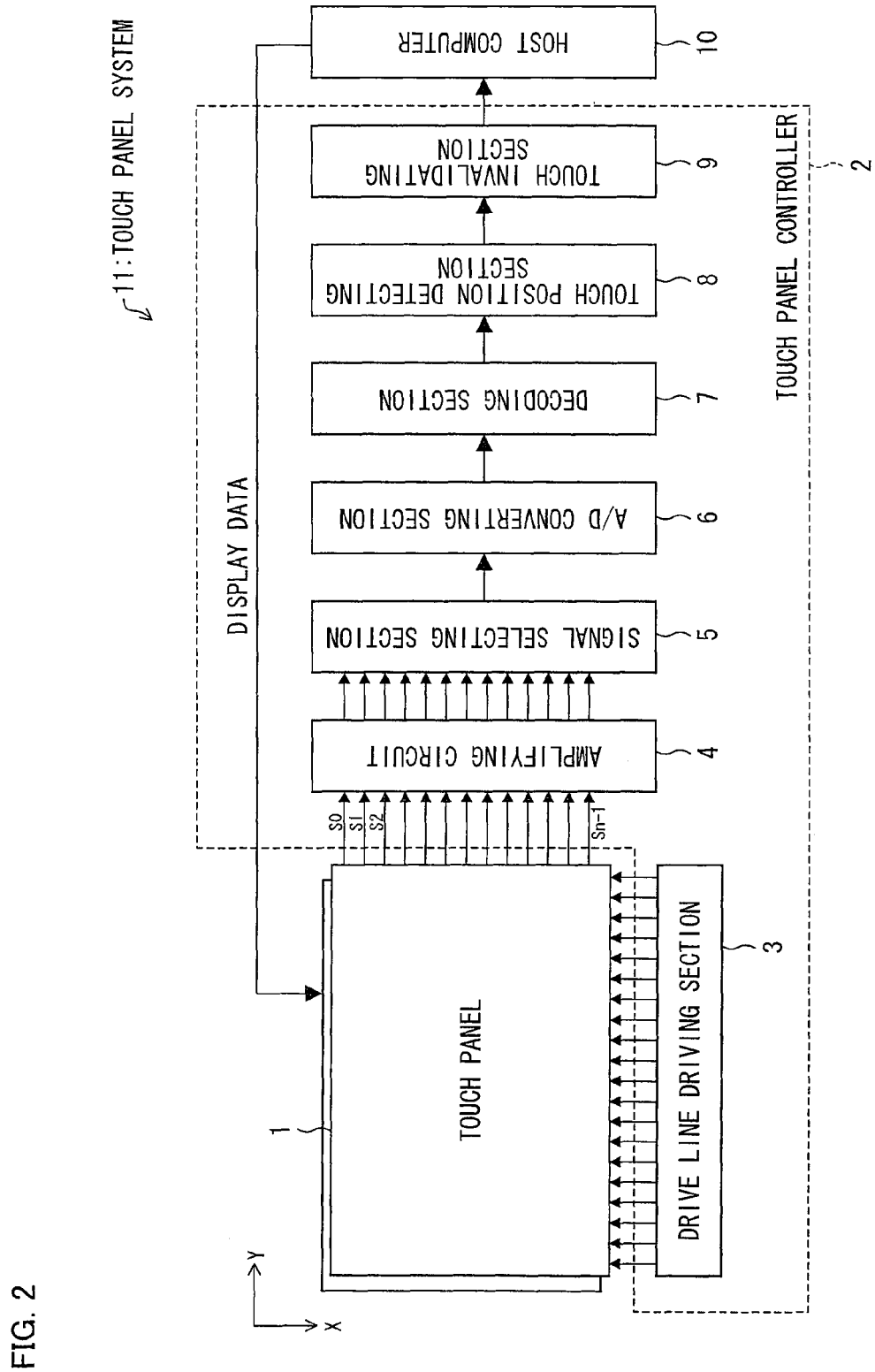
FIG. 2

FIG. 2 is a block diagram illustrating an outline configuration of a touch panel system of the present embodiment provided in an electronic apparatus.

A touch panel system 11 includes a touch panel 1 and a touch panel controller 2. The touch panel 1 and the touch panel controller 2 are configured to be capable of detecting simultaneous touches on a plurality of points of the touch panel 1. One example of the configuration is a so-called capacitance type touch panel.

The touch panel 1 is disposed so as to overlap a display screen (not illustrated) of a display device. Examples of the display device encompass liquid crystal display devices, plasma display devices, organic EL display devices, and field emission display devices. Specific examples of the touch panel 1 encompass touch panels provided in portable electronic apparatuses (mobile electronic apparatuses) such as smartphones, tablet-type terminals, notebook computers, and the like.

The touch panel 1 includes a plurality of drive lines that extend in a vertical direction (the X direction in FIG. 2) and that are parallel to each other. Further, the touch panel 1 includes a plurality of sense lines (S0, S1, S2, . . . Sn-1) that extend in a horizontal direction (the Y direction in FIG. 2) and that are parallel to each other. Further, the touch panel 1 includes a plurality of electrostatic capacitors (not illustrated) formed at respective intersections of the plurality of drive lines and the plurality of sense lines.

The touch panel controller 2 is a system which is configured to allow for a touch operation using the touch panel 1 (an instruction given to the electronic apparatus in accordance with a touch on the touch panel 1). In this specification, the touch panel controller 2 means constituents elements, except for the touch panel 1, for accomplishing the touch operation.

The touch panel controller 2 includes a drive line driving section 3, an amplifying circuit 4, a signal selecting section 5, an A/D (analog/digital) converting section 6, a decoding section 7, a touch position detecting section 8, and a touch invalidating section 9. The touch panel system 11 includes a host computer 10.

The drive line driving section 3 drives the plurality of drive lines by applying a voltage to the plurality of drive lines. Thus, an electric charge is supplied to the plurality of electrostatic capacitors.

The amplifying circuit 4 reads out, for each of the sense lines, linear sum signals of electric charges accumulated in the plurality of electrostatic capacitors, and then supplies the linear sum signals to the signal selecting section 5.

The signal selecting section 5 selects one of the plurality of linear sum signals thus read out for each of the sense lines, and then supplies the linear sum signal thus selected to the A/D converting section 6.

The A/D converting section 6 converts the linear sum signal selected by the signal selecting section 5 from an analog signal to a digital signal, and then supplies the linear sum signal thus converted to the decoding section 7.

The decoding section 7 decodes the linear sum signal thus supplied from the A/D converting section 6 so as to obtain an electrostatic capacitance distribution, and then supplies the electrostatic capacitance distribution to the touch position detecting section 8.

The touch position detecting section 8 detects a touched point of the touch panel 1 on the basis of a distribution of X-coordinates and Y-coordinates on the electrostatic capacitance distribution, and then supplies the result of the detection to the touch invalidating section 9.

The touch invalidating section 9 judges whether or not the touched point of the touch panel 1 has been continuously touched for a predetermined period of time. The predetermined period of time is approximately 1 to several seconds. For example, the predetermined period of time is 2 seconds. In a case where the touched point of the touch panel 1 has been continuously touched for the predetermined period of time, the touch invalidating section 9 invalidates a touch operation corresponding to the touch.

The touch invalidating section 9 supplies information indicative of the touched point of the touch panel 1 to the host computer 10 in a case where the touch invalidating section 9 validates the touch operation. Meanwhile, in a case where the touch invalidating section 9 invalidates the touch operation, the touch invalidating section 9 awaits without supplying such information to the host computer 10.

That is, the touch invalidating section 9 has a function of invalidating, in a case where a specific point of the touch panel 1 is continuously touched for a predetermined period of time, an instruction that is given to an electronic apparatus including the touch panel 1 in accordance with the touch.

The host computer 10 is, for example, constituted by a CPU (Central Processing Unit). The host computer 10 controls the electronic apparatus in accordance with the information supplied from the touch invalidating section 9. For example, the host computer 10 causes display data corresponding to information supplied from the touch invalidating section 9 to be supplied to a display device provided in the electronic apparatus so that an image is displayed on a display screen of the display device.

[Example 1 of Touch Invalidating Section]

Figure 1:
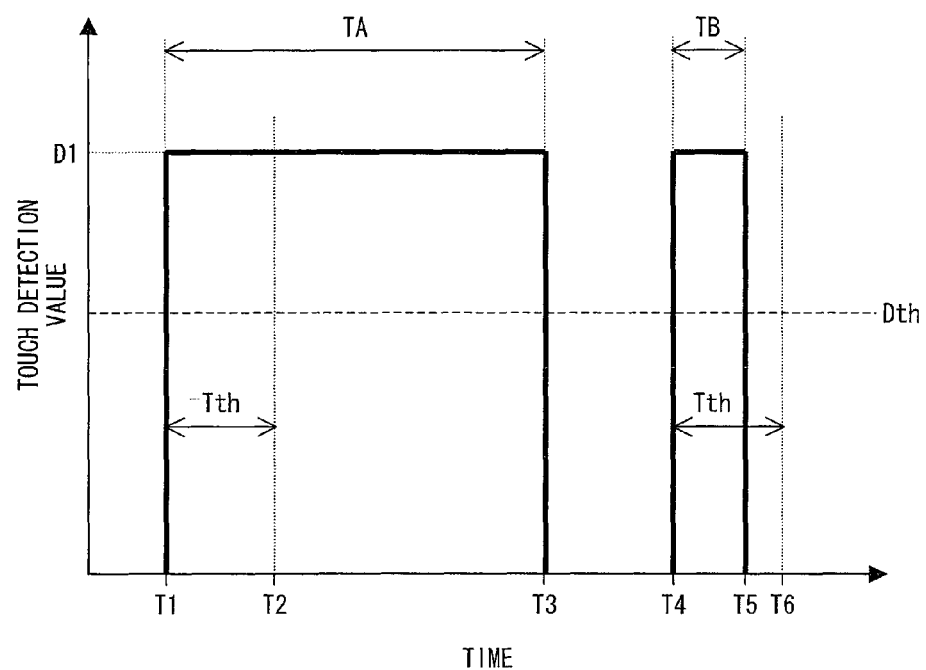
FIG. 1

FIG. 1 is a graph illustrating an example in which a touch operation is invalidated by the touch invalidating section 9 of the present embodiment.

In the graph of FIG. 1, the vertical axis represents a touch detection value and the horizontal axis represents an elapsed time.

The present example discusses an example in which an object makes contact with a single specific point of the touch panel 1.

In a case where an object makes contact with the touch panel 1, a touch detection value corresponding to an electrostatic capacitance at a contact point increases in accordance with the degree of this touch (pressure on the touch panel 1, range of the contact, etc.). The touch position detecting section 8 of the touch panel controller 2 judges that the contact point is being touched, in a case where the touch detection value is not less than a touch threshold value Dth or in a case where the touch detection value is above the touch threshold value Dth. The touch position detecting section 8 judges that the touch is continuing, until the touch detection value goes below the touch threshold value Dth or in a case where the touch detection value becomes not more than the touch threshold value Dth.

Generally, in a case where a human finger makes contact with the touch panel 1, the touch detection value is increased by this contact so as to exceed the touch threshold value Dth. Accordingly, in the present embodiment, it is assumed that (i) the touch position detecting section 8 judges that a touch is being made, in a case where the touch detection value is above the touch threshold value Dth, whereas (ii) the touch position detecting section 8 judges that no touch is being made, in a case where the touch detection value is not more than the touch threshold value Dth.

In the graph of FIG. 1, a time T1 at which the touch detection value becomes a value D1 which exceeds the touch threshold value Dth corresponds to a time at which the touch position detecting section 8 first judges that a touch is being made (a time at which the touch starts). This instant is set as a touch start time T1.

The touch invalidating section 9 judges whether or not the touch continues for a predetermined period of time. In other words, the touch invalidating section 9 judges whether or not a period of time for which the touch detection value is above the touch threshold value Dth continues for the predetermined period of time.

The touch invalidating section 9 makes this judgment with reference to a touch time threshold value Tth which is a period of time corresponding to the predetermined period of time. A time set as the touch time threshold value Tth is a specific period of time which lasts for this time (spans this time). In the graph of FIG. 1, a period of time from the touch start time T1 to a time T2 corresponds to the touch time threshold value Tth. The time T2 is a time at which the touch time threshold value Tth (the predetermined period of time) has elapsed from the touch start time T1. Accordingly, the touch time threshold value Tth is expressed by (time T2−time T1).

It is preferable that the touch invalidating section 9 thus judge whether or not the touch continues for the touch time threshold value Tth which corresponds to the predetermined period of time.

This makes it possible to judge, with a simple configuration, whether or not the contact point is continuously touched for the predetermined period of time.

That is, the touch invalidating section 9 judges whether or not continuous touch periods TA and TB (periods in which the touch detection value is being above the touch threshold value Dth) are not less than the period of time represented by the touch time threshold value Tth.

In a case where the continuous touch period TA which starts at the time T1 and ends at a time T3 is not less than the period of time represented by the touch time threshold value Tth, the touch invalidating section 9 judges that the touch continued for the predetermined period of time. Based on this judgment, the touch invalidating section 9 invalidates a touch operation corresponding to the touch (see the continuous period TA in FIG. 1).

Meanwhile, in a case where the continuous touch period TB which starts at a time T4 and ends at a time T5 is less than the period of time represented by the touch time threshold value Tth which starts at the time T4 and ends at a time T6, the touch invalidating section 9 judges that the touch did not continue for the predetermined period of time. Based on this judgment, the touch invalidating section 9 validates the touch operation corresponding to the touch (see the continuous period TB in FIG. 1).

In a case where a specific point of the touch panel 1 is continuously touched for a predetermined period of time, the touch invalidating section 9 invalidates an instruction that is given in accordance with the touch to the electronic apparatus. Accordingly, in a case where an unintended contact of an object with the touch panel 1 continues, such as a case where a hand holding the electronic apparatus is in contact with the touch panel 1, an instruction corresponding to the contact is not executed. This makes it possible to prevent an incorrect operation caused by such an unintended contact of an object with the touch panel 1.

Moreover, there is no need to change a standard by which presence or absence of a touch is judged for the purpose of preventing such an incorrect operation, unlike the above-mentioned conventional art. It is therefore possible to suppress a decline in sensitivity of detection of presence or absence of a touch.

Figure 3:
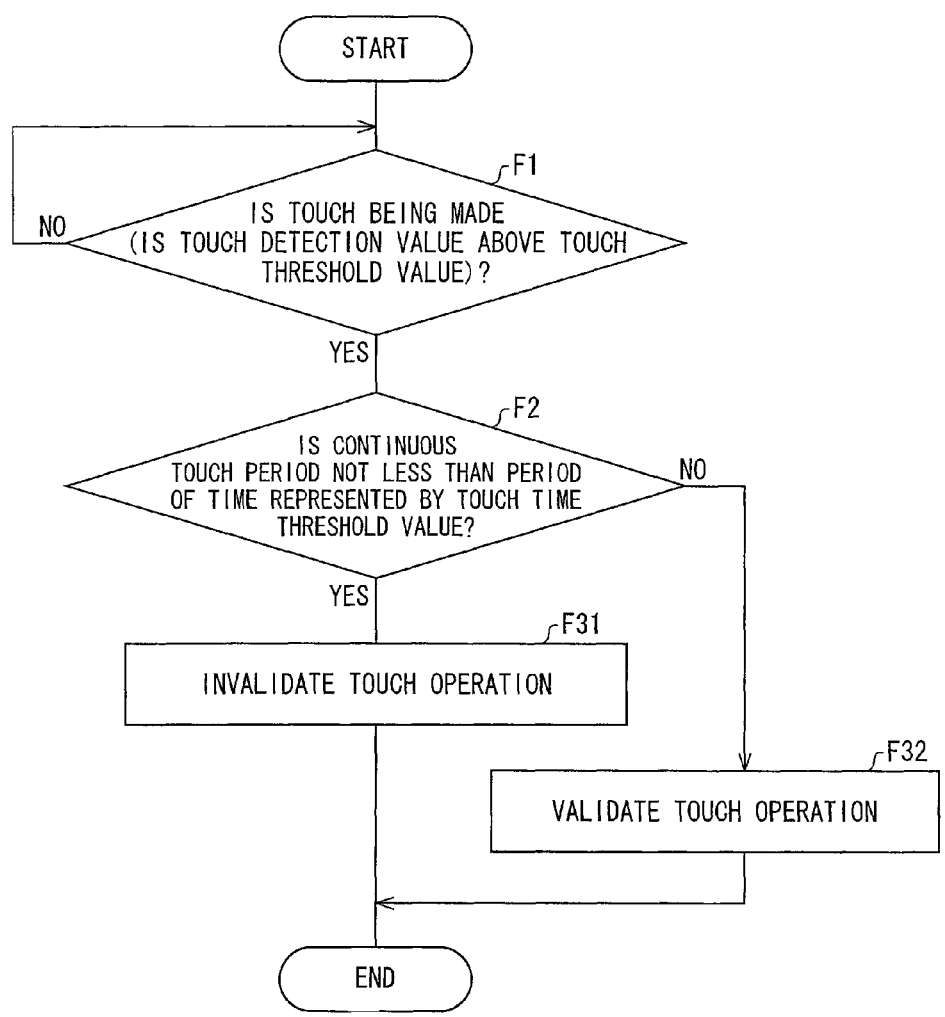
FIG. 3

FIG. 3 is a flow chart showing an example of how a touch operation is invalidated by the touch invalidating section 9 of the present embodiment.

First, the touch position detecting section 8 judges whether or not a contact point is being touched, by judging whether or not a touch detection value corresponding to the contact point is above the touch threshold value Dth (Step F1). In a case where the touch detection value is not above the touch threshold value Dth (NO in Step F1), the judgment is made again.

In a case where the touch detection value is above the touch threshold value Dth (YES in Step F1), the touch invalidating section 9 detects whether or not a continuous touch period of the touch is not less than a period of time represented by the touch time threshold value Tth (Step F2).

In a case where the continuous touch period is not less than the period of time represented by the touch time threshold value Tth (YES in Step F2), the touch invalidating section 9 judges that the touch continued for the predetermined period of time, and invalidates a touch operation corresponding to the touch (Step F31).

Meanwhile, in a case where the continuous touch period is less than the period of time represented by the touch time threshold value Tth (NO in Step F2), the touch invalidating section 9 judges that the touch did not continue for the predetermined period of time, and validates the touch operation corresponding to the touch (Step F32).

[Example 2 of Touch Invalidating Section]

Figure 4:
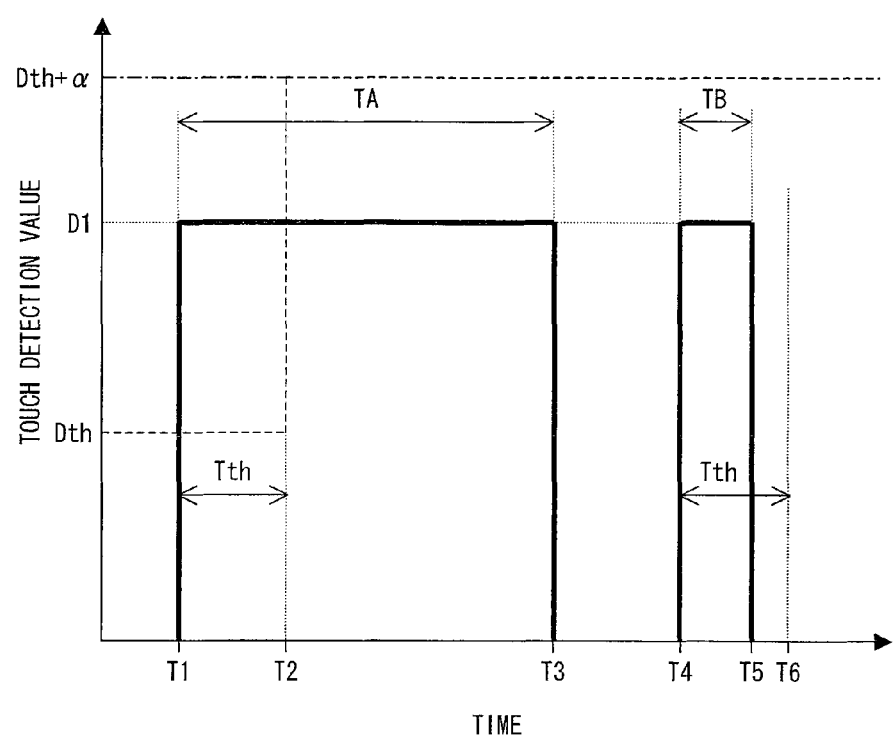
FIG. 4

FIG. 4 is a graph illustrating another example in which a touch operation is invalidated by the touch invalidating section 9 of the present embodiment.

The graph of FIG. 4 is based on the graph of FIG. 1. The following description, which is given with reference to the graph of FIG. 4, deals with only matters different from the description given with reference to the graph of FIG. 1, and the other matters are omitted for convenience of description.

In the example shown by the graph of FIG. 1, the touch threshold value Dth, which is a threshold value for judging based on a touch detection value whether a touch is being made, does not change over time.

Meanwhile, in the example shown by the graph of FIG. 4, the touch invalidating section 9 changes a touch threshold value in accordance with passage of time.

In the example shown by the graph of FIG. 4, since a touch detection value is being a value D1 which exceeds the touch threshold value Dth, over a touch time threshold value Tth corresponding to a period of time from the touch start time T1 to the time T2, the touch invalidating section 9 makes the touch threshold value higher by α than Dth. That is, in a case where the touch continues for the touch time threshold value Tth (the predetermined period of time), the touch invalidating section 9 makes the touch threshold value higher by α than Dth for a certain period of time. The certain period of time is, for example, a period of time until display device or an electronic apparatus is turned off or a period of time shorter than this period of time. It is preferable that the touch threshold value (Dth+α) thus increased is a value that is sufficiently larger than a touch detection value obtained by contact of a human finger with the touch panel 1. That is, it is preferable that the touch threshold value (Dth+α) thus increased is a value that does not allow a contact with the touch panel 1 to be judged as a touch.

This allows the touch invalidating section 9 to invalidate a touch operation regardless of a continuous touch period after the touch threshold value is made higher by α than Dth, i.e., after the time T2 of FIG. 4. In this case, even in a case where a continuous touch period TB which starts at a time T4 and ends at a time T5 is less than the period of time represented by the touch time threshold value Tth which starts at the time T4 and ends at a time T6, the touch invalidating section 9 can invalidates a touch operation corresponding to the touch.

In a case where a continuous touch period is not less than the period of time represented by the touch time threshold value Tth, the touch invalidating section 9 judges that the touch continued for the predetermined period of time, and the touch invalidating section 9 invalidates a touch operation corresponding to the touch and makes the touch threshold value higher by α than Dth (see the period TA in FIG. 4).

After the touch threshold value is made higher by a than Dth, even if a continuous touch period TB corresponding to a next touch is less than the period of time represented by the touch time threshold value Tth, a touch detection value D1 is not more than the touch threshold value (Dth+α). Accordingly, the touch invalidating section 9 invalidates a touch operation corresponding to the touch (see the period TB in FIG. 4).

As described above, the touch invalidating section 9 can be configured to increase a touch threshold value in a case where a touch continues for a predetermined period of time, so as to invalidate a touch operation corresponding to the touch for a certain period of time.

Consequently, even in a case where an unintended contact of an object with the touch panel 1 frequently occurs in a short time, it is possible to prevent an incorrect operation, which can occur every time the contact is made, by causing the touch invalidating section 9 to function just once.

Moreover, it is possible to achieve, with a simple configuration, an arrangement in which in a case where a specific point is continuously touched for a predetermined period of time, the touch invalidating section 9 increases a touch threshold value so that an instruction corresponding to a touch on this point is invalidated for a certain period of time.

[Configuration of Electronic Apparatus]

Figure 5:
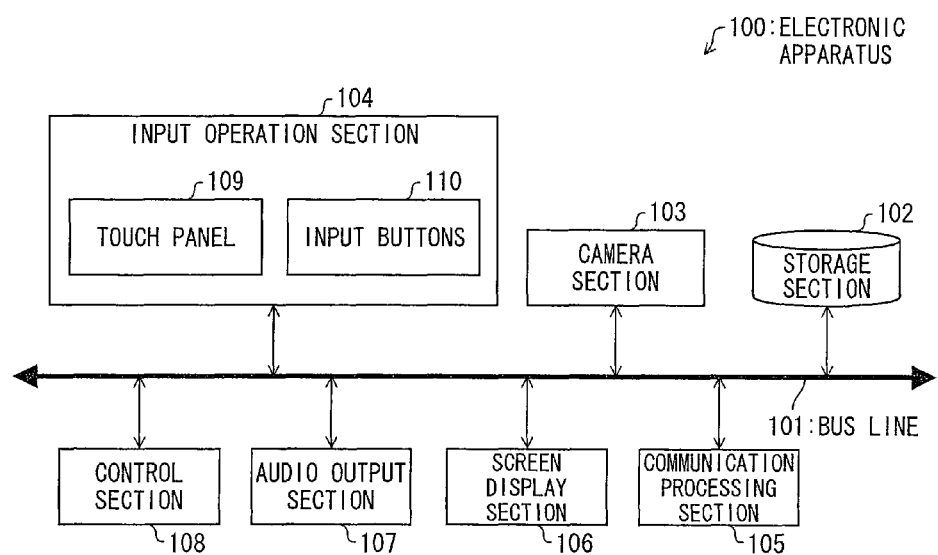
FIG. 5

FIG. 5 is a block diagram illustrating an example of an outline configuration of an electronic apparatus 100 of the present embodiment.

The electronic apparatus 100 illustrated in FIG. 5 is a mobile apparatus. FIG. 5 shows an example in which the electronic apparatus 100 is a smartphone.

The electronic apparatus 100 includes a bus line 101. The electronic apparatus 100 includes a storage section 102, a camera section 103, an input operation section 104, a communication processing section 105, a screen display section 106, an audio output section 107, and a control section 108 each of which is connected to the bus line 101.

The storage section 102 is, for example, constituted by a ROM (Read Only Memory) and a RAM (Random Access Memory). In the storage section 102, various kinds of data such as data of an image taken by the camera section 103 and data of an image to be displayed on a display screen which is a main part of the screen display section 106 are stored.

The camera section 103 is, for example, constituted by an imaging module which includes an imaging lens and an imaging device. The camera section 103 is for taking a photograph of an object (subject).

The input operation section 104 includes a touch panel 109 and input buttons 110.

The touch panel 109 has an identical configuration to the touch panel 1 (see FIG. 2), and is disposed so as to overlap the display screen. The touch panel 109 is capable of giving the electronic apparatus 100 various kinds of instruction according to a touched point, a continuous touch period, etc.

The input buttons 110 are a plurality of buttons provided on a housing (not illustrated) or the like of the electronic apparatus 100. The input buttons 110 are capable of giving the electronic apparatus 100 various kinds of instruction according to a pressed button, a combination of pressed buttons, a period of time for which a button is being pressed, a timing at which a button is pressed, etc.

The communication processing section 105 is responsible for communication between the electronic apparatus 100 and an outside of the electronic apparatus 100, such as reception of television broadcast, connection with various kinds of communication networks including Internet, and communication with other terminals (telephone call etc. in the case of a mobile terminal). The communication processing section 105 includes various kinds of antennas for transmitting and receiving a radio wave, a peripheral circuit (peripheral equipment) of the antennas, etc.

The screen display section (display device) 106 includes a display screen on which an image is displayed. The screen display section (display device) 106 is any of a liquid crystal display device, a plasma display device, an organic EL display device, and a field emission display. As described above, the touch panel 109 is disposed so as to overlap the display screen which is a main part of the screen display section 106. Note that a structure of the touch panel 109 is not illustrated nor described in detail here.

The audio output section 107 includes a speaker or the like. The audio output section 107 outputs audio to an outside.

The control section 108 collectively controls the storage section 102, the camera section 103, the input operation section 104, the communication processing section 105, the screen display section 106, and the audio output section 107 via the bus line 101. For the purpose of this control, the control section 108 writes data to be stored into the storage section 102 and reads desired data from the storage section 102 as necessary.

The control section 108 is mainly constituted by a CPU. The control section 108 corresponds to the host computer 10 (see FIG. 2). Note, however, that taking into consideration that the control section 108 carries out signal processing based on input from the touch panel 1, it can be interpreted that the control section 108 includes the constituent elements of the touch panel controller 2 (see FIG. 2) including hardware.

It is thus possible to provide the electronic apparatus 100 that is capable of preventing an incorrect operation caused by an unintended contact of an object with the touch panel 1 while suppressing a decline in sensitivity of detection of presence or absence of a touch.

[Example 3 of Touch Invalidating Section]

It is possible to cause the touch invalidating section 9 to function (invalidate, in a case where a specific point is continuously touched for a predetermined period of time, an instruction that is given in accordance with the touch to the electronic apparatus) only in a part of the touch panel 1. Such an example is described below with reference to (a) and (b) of FIG. 6.

(a) and (b) of FIG. 6 are diagrams illustrating still another example in which a touch operation is invalidated by the touch invalidating section 9 of the present embodiment.

A tablet-type terminal (electronic apparatus) 200 illustrated in (a) and (b) of FIG. 6 includes a touch panel 1 that is disposed so as to overlap a display screen, a gravity sensor 201, and a frame 202. Further, the tablet-type terminal 200 includes the touch panel controller 2 (not illustrated, see FIG. 2).

In the following description, it is assumed that (i) the tablet-type terminal 200 has a substantially rectangular shape from a plan view and (ii) the gravity sensor 201 is provided in a part of the frame 202 which part constitute a short side of the tablet-type terminal 200, in accordance with the illustration of (a) and (b) of FIG. 6. A state in which the tablet-type terminal 200 is held so that a short side of the tablet-type terminal 200 faces the ground (see (a) of FIG. 6) is referred to as a portrait orientation, and a state in which the tablet-type terminal 200 is held so that a long side of the tablet-type terminal 200 faces the ground (see (b) of FIG. 6) is referred to as a landscape orientation.

The gravity sensor 201 detects an orientation of the tablet-type terminal 200 with respect to the gravity (ground). The tablet-type terminal 200 is configured to be capable of controlling its functions, operations, etc. in accordance with the orientation of the tablet-type terminal 200 with respect to the gravity thus detected by the gravity sensor 201.

It is well known that not only tablet-type terminals including a gravity sensor but also any electronic apparatuses including a gravity sensor can be controlled in accordance with orientations of the electronic apparatuses. For example, the tablet-type terminal 200 can be controlled to display an image so that an orientation of the image in the portrait orientation (see (a) of FIG. 6) is different from that in the landscape orientation (see (b) of FIG. 6).

In a case where the tablet-type terminal 200 is held in the portrait orientation, hands (objects) 203 holding the tablet-type terminal 200 are generally located on portions of the frame 202 which constitute the long sides of the tablet-type terminal 200 (see (a) of FIG. 6). As such, it is likely that the hands 203 unintentionally make contact with portions of the touch panel 1 that are in the vicinity of the hands 203.

In view of this, in a case where the tablet-type terminal 200 is held in the portrait orientation, only regions of the touch panel 1 that are in the vicinity of the portions of the frame 202 which constitute the long sides of the tablet-type terminal 200 are set as regions in which the touch invalidating section 9 functions. Specific examples of such regions in which the touch invalidating section 9 functions are regions 204.

Meanwhile, in a case where the tablet-type terminal 200 is held in the landscape orientation, the hands 203 holding the tablet-type terminal 200 are generally located on portions of the frame 202 which constitute the short sides of the tablet-type terminal 200 (see (b) of FIG. 6). As such, it is likely that the hands 203 unintentionally make contact with portions of the touch panel 1 that are in the vicinity of the hands 203.

In view of this, in a case where the tablet-type terminal 200 is held in the landscape orientation, only regions of the touch panel 1 that are in the vicinity of the portions of the frame 202 which constitute the short sides of the tablet-type terminal 200 are set as regions in which the touch invalidating section 9 functions. Specific examples of such regions in which the touch invalidating section 9 functions are regions 205.

In the tablet-type terminal 200, there are cases where it is desired that an instruction corresponding to a long touch on a specific point of the touch panel 1 (so-called "press and hold") be executed. It is not preferable that a region of the touch panel 1 in which region such a long touch is expected to be made be set as the region in which the touch invalidating section 9 functions. According to the above arrangement, it is possible to achieve both of (i) execution of such an instruction corresponding to a long touch on a specific point of the touch panel 1 and (ii) invalidation of a touch by the touch invalidating section 9.

Further, in the tablet-type terminal 200, there are cases where a region preferable as the region in which the touch invalidating section 9 functions should be changed in accordance with the orientation of the tablet-type terminal 200. By changing such a region in accordance with a result of detection of the orientation of the tablet-type terminal 200 with respect to the gravity, the touch invalidating section 9 can be caused to function in a manner according to a change of the orientation of the tablet-type terminal 200.

The above description has dealt with an example in which (i) the gravity sensor 201 for detecting an orientation of the tablet-type terminal 200 with respect to the gravity is provided in the tablet-type terminal 200 and (ii) a region in which the touch invalidating section 9 functions is changed in accordance with the orientation of the tablet-type terminal 200 detected by the gravity sensor 201. Note, however, that such a region in which the touch invalidating section 9 functions may be a predetermined fixed region.

For example, it is possible that a region of the touch panel 1 with which region the hands 203 holding the tablet-type terminal 200 are expected to be likely to make contact be set in advance as the region in which the touch invalidating section 9 functions. Alternatively, it is also possible that the whole of portions of the touch panel 1 that are in the vicinity of the frame 202 be set as the region in which the touch invalidating section 9 functions. In this way, the region in which the touch invalidating section 9 functions can be set without the need for the control operation according to a result of detection by the gravity sensor 201.

The touch panel system of the present invention is preferably arranged such that the touch invalidating section judges whether or not the touch continues for a touch time threshold value which is a period of time corresponding to the predetermined period of time.

According to the arrangement, it is possible to judge, with a simple configuration, whether or not the point is continuously touched for the predetermined period of time.

Further, the touch panel system of the present invention is preferably arranged such that, in a case where the point is continuously touched for the predetermined period of time, the touch invalidating section invalidates an instruction corresponding to a next touch on the point.

According to the arrangement, even in a case where an unintended contact of an object with the touch panel frequently occurs in a short time, it is possible to prevent an incorrect operation, which can occur every time the contact is made, by causing the touch invalidating section 9 to function just once.

Further, the touch panel system of the present invention is preferably arranged such that the touch invalidating section judges that the point is being touched, in a case where a level of a signal indicative of a degree of contact of an object with the point is not less than a touch threshold value, which is a standard for the level, or in a case where the level is above the touch threshold value, and the touch invalidating section increases the touch threshold value in a case where the point is continuously touched for the predetermined period of time.

According to the arrangement, it is possible to invalidate, with a simple configuration, an instruction corresponding to a touch on the point for a certain period of time.

The electronic apparatus of the present invention is preferably arranged such that the touch invalidating section functions only in a part of the touch panel.

According to the arrangement, only the part of the touch panel can be set as a region in which the function of the touch invalidating section is executed.

In the electronic apparatus, there are cases where it is desired that an instruction corresponding to a long touch on a specific point of the touch panel (so-called "press and hold") be executed. It is not preferable that a region of the touch panel in which region such a long touch is expected to be made be set as the region in which the function of the touch invalidating section is executed. According to the above arrangement, it is possible to achieve both of (i) execution of such an instruction corresponding to a long touch on a specific point of the touch panel and (ii) invalidation of a touch by the touch invalidating section.

The electronic apparatus of the present invention is especially preferably arranged such that the part of the touch panel is a region of the touch panel which region a hand holding the electronic apparatus makes contact with.

Further, the electronic apparatus of the present invention is preferably arranged so as to further include a gravity sensor which detects an orientation of the electronic apparatus with respect to gravity, the touch invalidating section changing the part of the touch panel in accordance with a result of the detection of the gravity sensor.

In the electronic apparatus, there are cases where a region preferable as the part of the touch panel should be changed in accordance with an orientation of the electronic apparatus. According to the arrangement, the part of the region is changed in accordance with a result of detection of an orientation of the electronic apparatus with respect to the gravity. This allows the touch invalidating section to function in a manner according to a change of the orientation of the electronic apparatus.

Further, the electronic apparatus of the present invention is preferably arranged such that the display device includes a display screen on which an image is displayed, the display device is any one of a liquid crystal display device, a plasma display device, an organic EL (ElectroLuminescence) display device, and a field emission display device, and the touch panel is disposed so as to overlap the display screen of the display device.

Further, the electronic apparatus of the present invention is preferably arranged such that the touch panel includes: a plurality of drive lines that extend in a vertical direction and that are parallel to each other; a plurality of sense lines that extend in a horizontal direction and that are parallel to each other; and a plurality of electrostatic capacitors that are provided at respective intersections of the plurality of drive lines and the plurality of sense lines.

In other words, the touch panel of the present invention is preferably a capacitance type touch panel.

Further, the electronic apparatus of the present invention is a portable apparatus. Examples of the portable apparatus encompass portable apparatuses such as smartphones, tablet-type terminals, notebook computers, and the like.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to touch panel systems and electronic apparatuses. Specifically, the present invention is applicable to portable electronic apparatuses, such as smartphones, tablet-type terminals, notebook computers, digital cameras, and the like, which have a 20 inch or less display screen, and to touch panel systems provided in the electronic apparatuses.

REFERENCE SIGNS LIST

1: Touch panel
2: Touch panel controller
5: Signal selecting section
9: Touch invalidating section
11: Touch panel system
100: Electronic apparatus
106: Screen display section (display device)
109: Touch panel
200: Tablet-type terminal (electronic apparatus)
201: Gravity sensor
204: Region
205: Region
T1 Time
T2: Time

The invention claimed is:
1. A touch panel system comprising a touch invalidating section which, in a case where a specific point of a capaci- tance type touch panel is continuously touched one time for a predetermined period of time, invalidates an instruction that is given, in accordance with the touch, to an electronic apparatus including the touch panel, the touch invalidating section judging whether or not the touch continues for a touch time threshold value which is a period of time corresponding to the predetermined period of time, in a case where the specific point is continuously touched for the predetermined period of time, the touch invalidating section invalidating an instruction corresponding to a next touch on the specific point, wherein the next touch on the specific point is a touch on the specific point which starts after the touch continues for the predetermined period of time on the specific point and is subsequently removed, the touch invalidating section judging that the specific point is being touched, in a case where a level of a signal indicative of a degree of contact of an object with the point is not less than a touch threshold value, which is a standard for the level, or in a case where the level is above the touch threshold value, and the touch invalidating section increasing the touch threshold value so that the level of the signal of the touch is not more than the touch threshold value thus increased, in a case where the specific point is continuously touched for the predetermined period of time.

2. An electronic apparatus comprising:
a touch panel system as set forth in claim 1; and
a display device corresponding to the touch panel,
the touch panel system and the display device being configured to be capable of detecting simultaneous touches on a plurality of points of the touch panel.

3. The electronic apparatus according to claim 2, wherein the touch invalidating section functions only in a part of the touch panel.

4. The electronic apparatus according to claim 3, wherein the part of the touch panel is a region of the touch panel which region a hand holding the electronic apparatus makes contact with.

5. The electronic apparatus according to claim 3, further comprising a gravity sensor which detects an orientation of the electronic apparatus with respect to gravity,
    the touch invalidating section changing the part of the touch panel in accordance with a result of the detection of the gravity sensor.

6. The electronic apparatus according to claim 2, wherein:
the display device includes a display screen on which an image is displayed,
the display device is any one of a liquid crystal display device, a plasma display device, an organic EL display device, and a field emission display device, and
the touch panel is disposed so as to overlap the display screen of the display device.

7. The electronic apparatus according to claim 2, wherein:
the touch panel includes:
a plurality of drive lines that extend in a vertical direction and that are parallel to each other;
a plurality of sense lines that extend in a horizontal direction and that are parallel to each other; and
a plurality of electrostatic capacitors that are provided at respective intersections of the plurality of drive lines and the plurality of sense lines.

8. The electronic apparatus according to claim 2, wherein the electronic apparatus is a portable apparatus.

9. The electronic apparatus according to claim 2,
the touch invalidating section increasing the touch threshold value until the electronic apparatus is turned off.

\* \* \* \* \*